United States Patent [19]

LaBorde

[11] 4,369,851
[45] Jan. 25, 1983

[54] TRANSMISSION SYSTEM

[76] Inventor: Joseph D. LaBorde, 1165 N. Main, Vidor, Tex. 77662

[21] Appl. No.: 200,253

[22] Filed: Oct. 23, 1980

[51] Int. Cl.³ .............................................. B62D 11/02
[52] U.S. Cl. .................................................. 180/6.66
[58] Field of Search ................... 180/6.2, 6.66; 74/203

[56] References Cited
U.S. PATENT DOCUMENTS 3,235,019  2/1966  Peterson ............................. 180/6.66
3,444,837  5/1969  Donofrio ......................... 180/6.2 X Primary Examiner—John A. Pekar
Attorney, Agent, or Firm—Browning, Bushman, Zamecki & Anderson

[57] ABSTRACT

A vehicular control system utilizes a combination of drive mechanisms to provide a simple and inexpensive drive and steering system. A power unit is connected by sheaves and belts to drive a first drive shaft. A second driven shaft has independent portions coupled to wheels on opposite sides of the vehicle. The coupling of power to the wheels is accomplished in a first mode by engaging a belt between pulleys on the drive and driven shafts to provide drive control of the vehicle in a first direction. However, by simply reversing drive control levers, a second mode of coupling is selected that engages frictional drums on each of the drive and driven shafts in a direct drive relation that causes rotation of the driven shaft portions in an opposite direction to that of the first mode to operate the vehicle in an opposite direction. By pushing drive control levers in opposite directions the independent portions of the driven shaft are rotated in opposite directions to thereby rotate wheels on opposed sides of the vehicle in opposite directions. Thus, power is utilized by wheels on both sides of the vehicle simultaneously but in opposite directions to more positively steer the vehicle.

7 Claims, 4 Drawing Figures

TRANSMISSION SYSTEM

BACKGROUND OF THE INVENTION

The present invention relates to a vehicle control system and more particularly to a new and improved vehicle drive and steering system.

Typically in so called all terrain vehicles two drive trains having a series of sprocket and chain assemblies or the like on each side of the vehicle are used independently to control wheels or tracks on opposite sides of the vehicle. Power to the separate drive trains is typically controlled by a pair of drive control levers, wherein one lever controls the wheels on one side of the vehicle and the other lever controls the wheels on the other side of the vehicle. Normally, moving a lever forward causes the wheels on that respective side to turn, and moving the lever rearwardly causes the wheels on that respective side to brake. A central position of the lever is neutral and has no effect on the wheels. Consequently, such a prior art vehicle control is used to cause the vehicle to move forwardly when the gear box is turning forward by moving both levers forwardly, turn to the left by moving the left lever back while holding the right lever forward, and turn right by moving the left lever forward and the right lever back. This operational pattern of the levers has been used for many years and operators of such vehicles have become accustomed to this type of steering system.

Many prior art vehicles of this type have utilized a separate power supply or engine for each side of the vehicle. An early example of such an apparatus is shown in Parker U.S. Pat. No. 1,430,251 which discloses an engine on each side of a four wheel tractor, with the engine being connected to respective wheels by a chain and sprocket drive system. Steering is accomplished by connecting power on one side of the vehicle to its respective wheels while disconnecting power on the opposite side to its respective wheels. A similar type of vehicle is disclosed in Shanahan et al U.S. Pat. No. 3,204,713, which utilizes a single power supply that is divided through separate drive trains to wheels on opposite sides of the vehicle and utilizes simultaneous braking on one side of the vehicle and wheel rotation on the other side of the vehicle to accomplish steering.

Rhoades U.S. Pat. No. 2,605,852 shows a vehicle having two separate electrical motors for each side of the vehicle and arranged in series across a power supply. Brakes are applied to the motor on one side of the vehicle which automatically speeds up the motor on the other side to accomplish steering. Rilling U.S. Pat. No. 3,616,869 utilizes a power supply to develop power through two hydraulic motors, one for each side of the vehicle, wherein the wheels on opposite sides of the vehicle are run at unequal speeds in order to accomplish steering. All of the above described systems offer various apparent disadvantages, but in the more modern steering control systems, the main drawbacks, aside from not providing positive steering of the vehicle are that such systems are complicated, and thus more expensive. In addition the utilization of separate power supplies for separate drive trains to accomplish steering is costly to build, maintain and operate. All terrain vehicles are usually used in remote locations where fuel supplies, maintenance etc., are difficult to obtain, thus making fuel economy and system simplicity important operational factors.

A more positive method of steering such vehicles is provided by turning the wheels or tracks on the opposite sides of the vehicle in opposite directions. Odom U.S. Pat. No. 2,542,157 shows such a system. One power supply is used to transmit power through a split drive train to track mechanism on opposite sides of the vehicles. The Odom system utilizes three control levers for controlling the drive and steering functions of the vehicle. Odom for the most part, uses positively connected transfer devices such as intermeshing bevel gears to transmit power and motion through the drive train, which on all terrain vehicles is a disadvantage. Because of the excessive roughness to which such equipment is subjected in its normal use, it is extremely important to utilize power transmission devices that have a give or slack so that sudden forces applied to the power drive system do not cause excessive fatigue to the mechanisms transmitting the motion and power.

It is therefore an object of the present invention to provide a new and improved drive and steering apparatus for an all terrain vehicle which will accomplish positive steering by providing means for rotating wheels on opposite sides of the vehicle in opposite directions, and which, by sufficiently simple design and construction will provide for low initial cost, minimize maintenance, accommodate the wear and tear of the hazardous environment in which such vehicles are operated, and utilize a traditional steering system to which operators of such vehicles have become accustomed.

SUMMARY OF THE INVENTION

With this and other objects in view the present invention contemplates a vehicle drive and steering apparatus having a first drive assembly for taking power from a power supply and rotating a first drive shaft. A second pair of drive shafts transmit rotative motion to wheels on opposite sides of the vehicle. A pair of control drive shafts, each having two power connection devices thereon, are arranged between the first and second drive shafts to be moved into mating power transmission contact with respective power connection devices on the first drive shaft. This movement is accomplished by levers on the vehicle which operate in the accustomed way for steering. Each set of the power connection devices on the first drive shaft and control drive shafts provides for different modes of power transmission whereby the mating contact of one such set of power connection devices causes rotation of vehicle wheels in one direction and mating contact of the other such set of power connection devices causes rotation of vehicle wheels in an opposite direction. Manipulation of the levers in a typical way causes wheels on opposite sides of the vehicle to operate in opposite directions to effect positive steering control of the vehicle.

DESCRIPTION OF THE PREFERRED EMBODIMENTS

Figure 1:
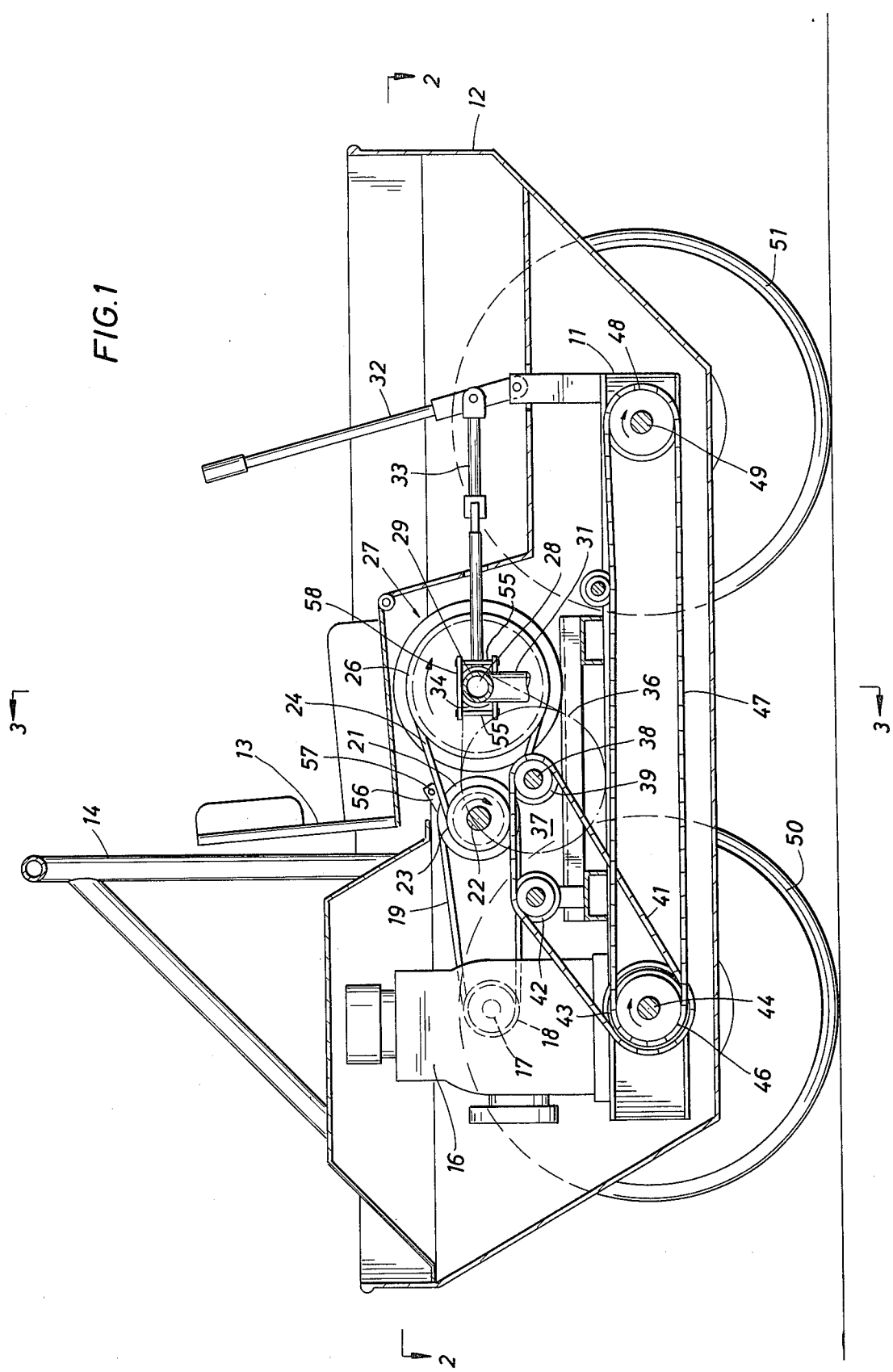
FIG. 1 is a side elevational view of a vehicle utilizing the present invention.
Figure 2:
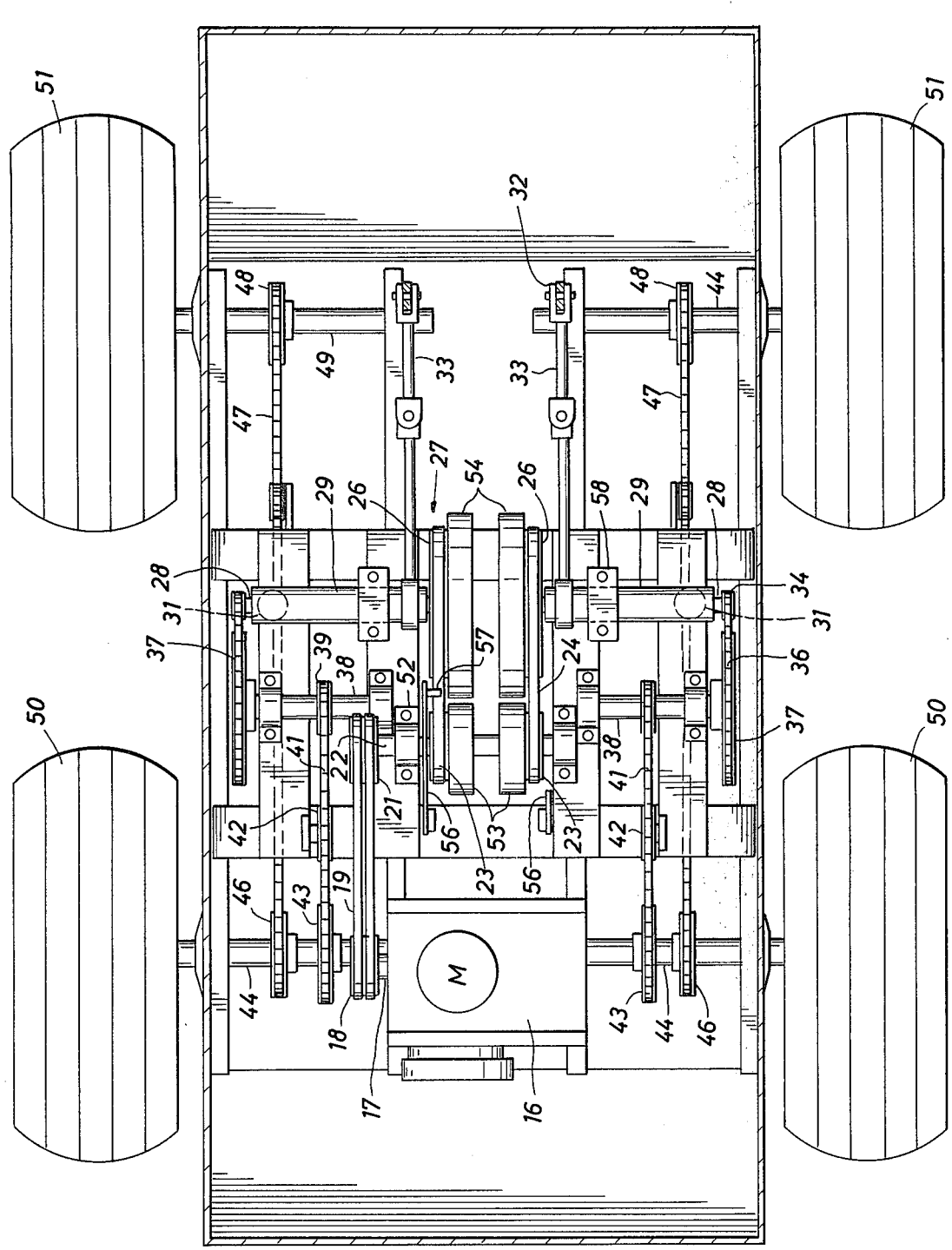
FIG. 2 is a cross-sectional view of the vehicle taken along lines 2—2 of FIG. 1 showing a plan view of the interior drive mechanisms of the vehicle.

Referring first to FIG. 1 of the drawings an all terrain vehicle and more particularly, in the embodiment described herein, a swamp buggy is shown having a frame 11 comprised of steel beams, channels, and plate material welded and bolted together in a unitary solid framework for supporting a body 12, seating apparatus 13, roll frame 14, and various other parts of the frame and body system not described in detail. An engine or power supply mechanism 16 is shown mounted at the rear of the frame 11 having an output shaft 17 upon which is mounted a sheave 18 for outputting power from the engine 16. A belt 19 transmits rotative motion from the sheave 18 to a sheave 21 mounted on a first drive shaft 22. Also mounted on the first drive shaft 22 is a sheave 23 for outputting rotative motion of shaft 22 through belt 24 to a driven sheave 26. Sheave 26 is mounted on a power control mechanism generally designated by the reference numeral 27. The power control mechanism includes a second drive shaft 28 upon which the sheave 26 is mounted, said shaft 28 being rotatably housed in a cylindrical bearing 29. The bearing 29 in turn is mounted on a vertical sleeve 31 that is movably mounted on the frame to provide for pivotal movement of the power control mechanism 27 in a horizontal plane. Control lever 32 is provided to control the pivotal movement of the control mechanism 27 and is connected thereto by means of a linkage 33 which is pivotally connected to the lever 32. Linkage 33 is adjustable to provide adjustments in the operation of the power control 27 and more particularly its positional relationship with first drive shaft 22. Sprocket 34 on the drive shaft 28 provides output rotative motion from the control drive 27 by means of a chain 36 connected to a sprocket 37. Sprocket 37 is connected by means of a shaft 38 to a sprocket 39 which in turn drives a chain 41 around sprockets 42 and 43 to axle 44 which rotates a rear wheel 50 of the vehicle. Another sprocket 46 on the shaft 44 drives a chain 47 which in turn is connected to a sprocket 48 mounted on axle 49 which rotates the front wheel 51 of the vehicle. The drive control mechanism and power transmitting apparatus for supplying power from the engine 16 to the wheels of the vehicle has been described for only one side of the vehicle. The opposite side works in exactly the same manner and is arranged in mirror image as best seen in FIG. 2. The two sides of the vehicle and the parts associated therewith may be referred to hereinafter as respective "left" and "right" sides. These terms are used for convenience only, and should not be construed in a limiting sense.

Now referring to FIG. 2 of the drawings, the drive train mechanism described with respect to FIG. 1 is shown in even greater detail in plan view so that the mechanisms for controlling power to opposite sides of the vehicle is clearly shown. The output shaft 17 from the motor 16 is shown having a pair of sheaves 18 mounted thereon driving dual V belts 19 to rotate the dual sheaves 21 on the first drive shaft 22. The drive shaft 22 is rotatably mounted on the vehicle frame by means of a bracket and bearing assembly 52. A pair of sheaves 23 are shown mounted in spaced apart positions on first drive shaft 22 to afford a first mode of power connection between the first drive shaft 22 and second drive shafts 28 on the drive control mechanisms 27. In addition, a pair of spaced apart drums 53 are mounted on shaft 22, which drums 53 have a frictional surface for engaging matingly arranged drums 54 on shafts 28. This arrangement of oppositely opposed drums 53 and 54 mounted on first and second drive shafts 22 and 28 respectively affords a second mode of power connection between the first and second drive shafts. By selective movement of drive control 27 the drums 53 and 54 may be engaged while the first mode of power connection, comprised of sheaves 23 and 26 on the first and second drive shafts respectively and belt 24, are simultaneously disengaged. A belt control arm 56 is positioned on the frame and arranged to position a projecting pin 57 above belt 24 to prevent the belt 24 from slipping off of the sheaves 23 and 26 when the apparatus is operated to disengage the mode of power connection represented by the sheaves 23, 26 and belt 24. In such mode of operation the belt 24 becomes slack on the sheaves and has a tendency to become misaligned therewith because of the pivotal rotation of shaft 28 about vertical sleeve 31.

Various other bearing and bracket assemblies are shown positioned throughout the power train of the vehicle to afford a holding connection between the vehicle frame and various shafts and sleeves mounted thereon and such assemblies will not be described in detail or referenced by numerals in this description. The mounting of sheaves, shafts, sprockets, and the like in this vehicle is done in a conventional manner unless otherwise described in detail.

Referring again to FIG. 2 in the drawings the second drive shafts or driven shafts 28 are rotated by one or the other of the alternate modes of power connection between the first drive shaft 22 and the second drive shafts 28. Rotation of shafts 28 thus rotates the sprockets 34 at the outward end of each of the shafts 28. Sprockets 34 in turn are connected by means of chains 36 to sprockets 37. The sprockets 37 in turn are shown driving smaller sprockets 39 mounted inwardly on shafts 38. Sprockets 39, by means of chains 41, drive output drive sprockets 43. Idler sprockets 42 maintain proper tension of the chain drives. The sprockets 43 are connected by means of axles 44 to rear wheels 50 on the vehicle to drive the rear wheels. Sprockets 46 also on axle 44 rotate chains 47 which pass around sprocket 48 to drive the front axles 49 and thereby rotate front wheels 51.

Figure 3:
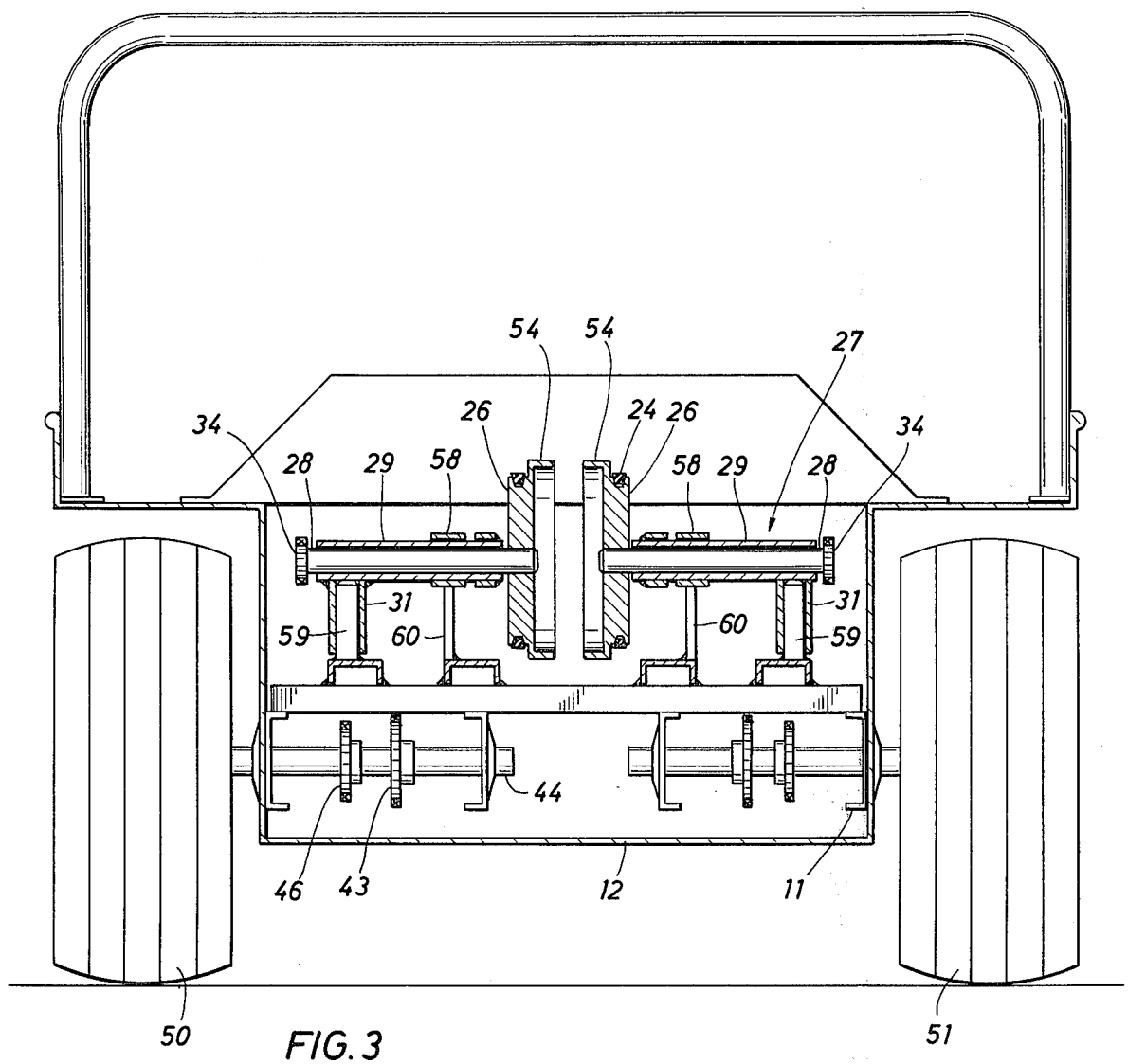
FIG. 3 is a cross-sectional view taken along the lines 3—3 of FIG. 1.

Next referring to FIG. 3 of the drawings, a cross-sectional endwise view of the vehicle control mechanism shows in greater detail how the control drive mechanism 27 is pivotally moved to bring the first and second modes of power connection into operation. As shown in FIG. 3, the second drive shafts 28 are mounted within sleeves 29 for rotation with respect thereto and are connected at their inward ends to sheaves 26 upon which are mounted laterally inwardly thereof, the frictional drums 54. Rotation of the shafts 28 causes rotation of output sprockets 34 which are connected, as described with respect to FIGS. 1 and 2, with the output drive train and ultimately to the wheels of the vehicle. A supporting pivot for sleeve 29 and shaft 28 is comprised of the sleeve 31 mounted rotatably about vertical post 59 which permits horizontal movement of the shaft 28 about the post 59. Such pivotal movement of shaft 28 alternatively engages the drum 54 with mating drum 53 on the first drive shaft or engages the V-belt 24 into the grooves of sheaves 24 and 26 to develop a second mode of power connection between the first and second drive shafts 22 and 28. It is noted that the sleeve 31 is eccentrically located along the length of bearing sleeve 29 so that a moment arm is developed with the linkage 33 being attached to the mechanism 27 inwardly from the pivot axis or post 59. This arrangement permits a small movement of the shaft 28 to effect a change in power connection modes and thus, because of the moment arm, a much smaller movement of sprocket 34. This prevents unnecessary slack in chain 36 in the drive chain to prevent wear of the chain and sprockets. Excessive lateral movement of shaft 28 is prevented by a stop which is formed by the bracket 58 best seen in FIG. 1. Vertical bolts or pins 55 mounted on bracket 58 on opposite sides of sleeve 29 limit the lateral movement of the sleeve 29 and shaft 28. Bracket 58 is connected to the frame by mounting plate 60.

Figure 4:
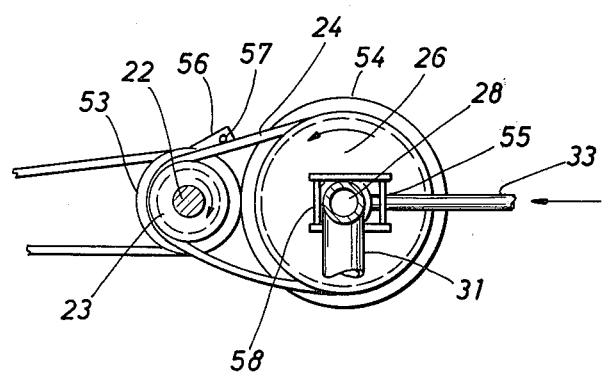
FIG. 4 is a detailed view of the mechanism providing dual modes of power connection between drive shafts.

Referring now to FIG. 4 of the drawings the alternative modes of power connection are shown in even greater detail wherein the frictional drums 53 and 54 are shown engaged, while the V-belt and sheave modes of power connection are disengaged. As shown in FIG. 4, a drum 53 is being rotated by the first drive shaft 22 in a clockwise direction. Frictional drum 53 is directly engaged with mating drum 54 on the second drive shaft 28 to drive the second drive shaft 28 in a counter-clockwise direction. However, manipulation of the lever 32 (FIG. 1) and connected linkage 33, causes the shaft 28 to pivot about the pivot post 59 only very slightly to disengage the mating frictional drums 53 and 54 and supply sufficient tension or separation between sheaves 23 and 26 to engage the V-belt 24 therein and rotate the shaft 28 in a clockwise direction. This alternative connection of power between the shafts 22 and 28 causes an opposite rotation than was accommodated by the power connection between the frictional drums.

It is thus seen that in order to control the vehicle, the pair of levers 32 may be moved simultaneously in the same direction forward to accommodate forward movement of the vehicle, be moved simultaneously rearwardly to afford backward movement of the vehicle, and may be oppositely moved; that is, one lever moved forward while the other is moved back to accommodate opposite rotation of the wheels on opposite sides of the vehicle to effect steering thereof.

To again summarize operations of the power drive herebefore described, the motor or engine 16 will rotate the output shaft 17 and sheaves 18 mounted thereon to drive the V-belts 19 to rotate sheaves 21. Sheaves 21 which are mounted on first drive shaft 22 rotate the sheave 23 and frictional drum 53 simultaneously. Mating sheaves 26 and drum 54 respectively on the second drive shaft 28 are alternatively and selectively connected in power connection with the sheave and drum respectively on the first drive shaft to transmit power from the first drive shaft 22 to second drive shaft 28. Rotation of the second drive 28 in turn causes rotation of sprockets 34 at the outward ends thereof which in turn drives chain 36, sprocket 37, shaft 38, sprocket 39, chain 41, sprocket 43, and axle 44, to drive the rear wheels. Another series of sprockets and chains 46, 47, and 48 drives front axle 49 and front wheels 51.

It can readily be seen that a variety of power connecting devices might be used in an application as described herein without varying from the true scope of this invention. For example, the pivotal arrangement of shaft 28 about the post 59 might be constructed so that the shaft 28 were pivoted about an axis parallel to the shaft 28 rather than perpendicular to it. Thus, by rotating the shaft 28 rearwardly towards the first drive shaft 22 the frictional drums would be brought into engagement and by movement of the frictional drums away from each other, the V-belt would be caused to embed itself into the grooves of the respective sheaves 23 and 26 to afford a power connection in a second mode. Another alternative arrangement of power connection might be afforded by providing an idler drum between the frictionally engaged drums 53 and 54 and thus by rotation of the shaft 28 about a parallel axis afford two modes of power connection between the shafts 22 and 28. Therefore, while particular embodiments of the present invention have been shown and described with respect to the drawings it is readily seen that other modifications and variations of the invention are possible in light of the above teachings and it is therefore understood that within the scope of the appended claims, the invention may be practiced otherwise than as specifically described herein.

I claim:

1. A vehicle in which driving power is applied separately to opposite sides of the vehicle including:

a frame;

an engine mounted on said frame;

left and right traction means on opposite sides of said frame;

a rotatable drive means operatively connected to said engine and rotated thereby, said drive means having a power transmission system mounted thereon for rotation therewith;

a left rotatable driven means operatively connected to said left traction means;

a right rotatable driven means operatively connected to said right traction means;

a left control means having first and second transmission means arranged for power connection with said transmission system of said drive means and operatively connected to said left driven means for rotating said left driven means in respective opposite directions, said left control means being mounted for movement with respect to said frame between a first position operatively connecting said first transmission means and disconnecting said second transmission means with said transmission system of said drive means and a second position connecting said second transmission means and disconnecting said first transmision means with said transmission system of said drive means;

a right control means having first and second transmission means arranged for power connection with said transmission system of said drive means and operatively connected to said right driven means for rotating said right driven means in respective opposite directions, said right control means being mounted for movement independently of said left control means and with respect to said frame between a first position operatively connecting said first transmission means and disconnecting said second transmission means with said transmission system of said drive means and a second position connecting said second transmission means and disconnecting said first transmission means with said transmission system of said drive means.

2. The vehicle of claim 1 wherein the first and second transmission means of each of said control means comprise respective first and second rotatable transmission members, each such first rotatable transmission member being directly connectable to the transmission system of said drive means for rotation in a first direction, and each such second rotatable transmission member being connectable to the transmission system of said drive means by means of a flexible closed loop for rotation in a second direction opposite said first direction;

and wherein such movement of each of said control means between its first and second positions effects movement of the respective first and second transmission members toward and away from said drive means.

3. The vehicle of claim 2 wherein each of said first rotatable transmission members of said control means is a drum, and wherein the transmission system of said drive means comprises drum means arranged for engagement with said drums of said control means.

4. The apparatus of claim 3 wherein each of said second rotatable transmission members of said control means is a pulley, and wherein said transmission system of said drive means comprises left and right pulleys respectively connected to the pulleys of said left and right control means by said loops.

5. The vehicle of claim 2 wherein said drive means comprises a drive shaft;

wherein each of said control means comprises a respective control shaft generally parallel to said drive shaft;

wherein each of said rotatable transmission members is mounted on the respective one of said control shafts for joint rotation therewith; and wherein each control shaft is mounted on a pivot axis generally transverse to said control shaft for said movement between said first and second positions.

6. The vehicle of claim 5 wherein each of said control means further comprises a linking element on said control shaft on the opposite side of said pivot axis from said rotatable transmission members for connection to the respective driven means, said first and second rotatable transmission members being spaced along said control shaft from said pivot axis by a greater distance than said linking element.

7. The vehicle of claim 6 further including left and right operator levers movably mounted on said frame and connected respectively to said left and right control means, each on the same side of the respective pivot axis as the respective transmission members.

* * * * *